US010847973B2

(12) United States Patent
Berger et al.

(10) Patent No.: US 10,847,973 B2
(45) Date of Patent: Nov. 24, 2020

(54) METHOD FOR CONTROLLING AN ELECTRICAL ENERGY DISTRIBUTION NETWORK, ENERGY DISTRIBUTION NETWORK AND CONTROL UNIT

(71) Applicant: Bayerische Motoren Werke Aktiengesellschaft, Munich (DE)

(72) Inventors: Jens Berger, Munich (DE); Martin Roemheld, Poing (DE); Thorsten Nicklass, Munich (DE); Klaus Heller, Munich (DE)

(73) Assignee: Bayerische Motoren Werke Aktiengeseiischaft, Munich (DE)

( * ) Notice: Subject to any disclaimer, the term of this patent is extended or adjusted under 35 U.S.C. 154(b) by 74 days.

(21) Appl. No.: 15/945,444

(22) Filed: Apr. 4, 2018

(65) Prior Publication Data
US 2018/0226795 A1 Aug. 9, 2018

Related U.S. Application Data

(63) Continuation of application No. PCT/EP2016/070291, filed on Aug. 29, 2016.

(30) Foreign Application Priority Data

Oct. 5, 2015 (DE) .................. 10 2015 219 206

(51) Int. Cl.
| H02J 3/00 | (2006.01) |
| H02J 3/38 | (2006.01) |
| H02J 13/00 | (2006.01) |
| H02J 3/06 | (2006.01) |
| G05B 13/02 | (2006.01) |
| G06Q 50/06 | (2012.01) |

(52) U.S. Cl.
CPC ............ H02J 3/008 (2013.01); G05B 13/024 (2013.01); G06Q 50/06 (2013.01); H02J 3/06 (2013.01); H02J 3/381 (2013.01); H02J 13/0013 (2013.01); Y02E 40/70 (2013.01); Y02E 60/00 (2013.01); Y04S 10/12 (2013.01); Y04S 10/50 (2013.01); Y04S 40/12 (2013.01); Y04S 50/10 (2013.01)

(58) Field of Classification Search
CPC ........ H02J 3/008; H02J 13/0013; H02J 3/381; H02J 3/06; G06Q 50/06; G05B 13/024; Y04S 10/60; Y04S 50/10; Y04S 40/12; Y04S 10/12; Y02E 40/72; Y02E 60/7807
See application file for complete search history.

(56) References Cited

U.S. PATENT DOCUMENTS

| 5,760,492 A * | 6/1998 | Kanoi | ................. H02J 3/06 307/18 |
| 8,847,570 B1 * | 9/2014 | Bell | ................. G06Q 50/06 323/301 |
| 2007/0203658 A1 * | 8/2007 | Patel | ................. G06Q 50/06 702/60 |
| 2008/0046387 A1 * | 2/2008 | Gopal | ................. G01D 4/004 705/412 |
| 2008/0269953 A1 * | 10/2008 | Steels | ................. H02J 7/0004 700/295 |
| 2012/0143385 A1 * | 6/2012 | Goldsmith | ................. H02J 3/38 700/297 |
| 2012/0296799 A1 * | 11/2012 | Playfair | ................. G06Q 10/00 705/37 |

(Continued)

FOREIGN PATENT DOCUMENTS

| EP | 2 506 382 A2 | 10/2012 | |
| JP | 2010122849 | * 6/2010 | ............... G06F 1/32 |

(Continued)

OTHER PUBLICATIONS

Caldon, R. Patria, A. R., & Turri, R. (2004). Optimal control of a distribution system with a virtual power plant, Bulk Power System Dynamics and Control—VI, Aug. 22-27, 278-284. (Year: 2004).*
Gburczyk, P., Wasiak, I., Mienski, R., & Pawelek, R. (2011). Energy management system as a mean for the integration of distributed energy sources with low voltage network, 11th International Conference on Electrical Power Quality and Utilisation, 1-5. (Year: 2011).*

(Continued)

Primary Examiner — Carlos R Ortiz Rodriguez
(74) Attorney, Agent, or Firm — Crowell & Moring LLP

(57) ABSTRACT

A method for controlling an electrical energy distribution network includes connecting at least one first distribution network of a first voltage level which comprises a plurality of network nodes to a power line of the at least one first distribution network, wherein a first part of the network nodes comprises energy consumers, a second part of the network nodes comprises energy generators, and a third part of the network nodes comprises both energy consumers and energy generators. A local unit of each of the network nodes records first energy quantity information which represents a measured energy quantity, and provides second energy quantity information which represents a tradable energy quantity. The method also includes transforming, by a device coupling the at least one first distribution network to a second distribution network, the first voltage level of the at least one first distribution network with a second voltage level of the second distribution network for an exchange of energy between the at least one first and second distribution network that is carried out, based on the first and second energy quantity information, between the network nodes within one of the at least one first distribution network and/or across different ones of the at least one first distribution network.

18 Claims, 2 Drawing Sheets

(56) References Cited

U.S. PATENT DOCUMENTS

| | | | | |
|---|---|---|---|---|
| 2014/0365023 A1* | 12/2014 | Kiefhaber | ............... | G06Q 50/06 |
| | | | | 700/291 |
| 2015/0088325 A1 | 3/2015 | Forbes, Jr. | | |
| 2016/0179077 A1* | 6/2016 | Le Boudec | ........... | H04L 41/046 |
| | | | | 700/295 |
| 2016/0322819 A1* | 11/2016 | Kopp | ..................... | G06Q 50/06 |
| 2017/0005515 A1* | 1/2017 | Sanders | .................. | H02J 3/381 |
| 2017/0041269 A1* | 2/2017 | Eger | ..................... | H04L 49/201 |
| 2017/0194814 A1* | 7/2017 | Chakraborty | .......... | G06Q 10/06 |

FOREIGN PATENT DOCUMENTS

| | | |
|---|---|---|
| WO | WO 20091036895 A2 | 3/2009 |
| WO | WO 2012/055566 A2 | 5/2012 |
| WO | WO 2014/057133 A2 | 4/2014 |
| WO | WO 2014/197931 A1 | 12/2014 |

OTHER PUBLICATIONS

PCT/EP2016/070291, International Search Report dated Dec. 1, 2016 (Three (3) pages).

German Search Report issued in German counterpart application No. 10 2015 219 206.7 dated Jun. 13, 2016, with Statement of Relevancy (Ten (10) pages).

\* cited by examiner

METHOD FOR CONTROLLING AN ELECTRICAL ENERGY DISTRIBUTION NETWORK, ENERGY DISTRIBUTION NETWORK AND CONTROL UNIT

CROSS REFERENCE TO RELATED APPLICATIONS

This application is a continuation of PCT International Application No. PCT/EP2016/070291, filed Aug. 29, 2016, which claims priority under 35 U.S.C. § 119 from German Patent Application No. 10 2015 219 206.7, filed Oct. 5, 2015, the entire disclosures of which are herein expressly incorporated by reference.

BACKGROUND AND SUMMARY OF THE INVENTION

The invention relates to a method for controlling an electrical energy distribution network, an energy distribution network and a control unit for an electrical energy distribution network.

An electrical energy distribution network consists of different subnetworks of different voltage levels. Electrical energy can be transported over long distances via a high-voltage or maximum-voltage network, for example with a voltage of 110 kV. The energy consumers, in particular private energy consumers, are connected to a low-voltage network, with e.g. a voltage of 400 V. In addition, a medium-voltage network, e.g. with a voltage of 11 kV, can also be provided between the low-voltage network and a high-voltage network for a transmission over shorter distances. A voltage transformation between the subnetworks is performed via coupling devices referred to as transformers.

The energy generation has hitherto been performed predominantly centrally using large energy generators, such as e.g. coal-fired power stations, nuclear power stations, gas-fired power stations, but also power stations using renewable energies, such as e.g. wind farms or solar energy systems. However, decentralized energy generation is increasing with the increasing spread of renewably used energy sources. This applies, in particular, when private consumers generate power, e.g. using photovoltaic systems or combined heat and power (CHP) systems.

The energy distribution network in its existing form is designed for the existence and presence of a number of central energy generators. This concerns, in particular, the aforementioned coupling devices which are designed to transform energy quantities from a higher voltage level to a lower voltage level. An energy flow in the opposite direction is possible in principle, but is associated with efficiency losses.

Final consumers are normally supplied by the power suppliers (i.e. operators of the central energy generators), wherein billing and distribution are carried out via the latter. The final consumer is able to sign a contract with any given power supplier. Although an energy exchange exists, it is not possible for final consumers to purchase energy quantities there. At the energy exchange, energy quantities are traded only between the central generators or suppliers and major customers. The final consumer is thus tied on the demand side to the static contract of the power supplier.

Due to the increasingly widespread decentralized energy generation, among final consumers also, an interest therefore exists, alongside the consumer's own local use of the privately generated power, in being able to supply the generated power also to parties other than the network operators or suppliers.

One object of the invention is to provide a method for controlling an electrical energy distribution network which allows functionally extended facilities for the provision of system services for an energy transmission network.

A further object of the invention is to indicate a corresponding energy distribution network and a control network for an electrical energy distribution network.

The method according to the invention serves to control an electrical energy distribution network by providing electrical energy via a multiplicity of network nodes connected via power lines. The electrical energy distribution network comprises at least one first distribution network of a first voltage level with a respective number of network nodes which are connected to a power line of the first distribution network. A first part of the network nodes comprises energy consumers. A second part of the network nodes comprises energy generators. A third part of the network nodes comprises both energy consumers and energy generators. Each of the network nodes comprises a local unit for recording and providing first energy quantity information and second energy quantity information. The first energy quantity information represents a measured energy quantity into and/or out of the respective network node. The second energy quantity information represents a tradable energy quantity which is, in principle, freely definable within the technical constraints of the network nodes.

The electrical energy distribution network furthermore comprises at least one second distribution network, in particular an energy transmission network, of a second voltage level. The second subnetwork comprises one or more central energy generators, such as e.g. power stations. The second voltage level is greater than the first voltage level. While the first voltage level is, for example, a low-voltage network, the second voltage level may be a high-voltage network or a medium-voltage network. The first and the second subnetwork are coupled via at least one coupling device transforming the voltages of the first and the second voltage level for the exchange of energy. In a manner known to the person skilled in the art, the coupling devices are corresponding transformers which can transform the voltage of the second voltage level into a voltage of the first voltage level. A direct transformation of the voltage from the second voltage level into the voltage of the first voltage level takes place with the existence of only one single coupling device. If at least one further, third voltage level whose voltage lies between the first and the second voltage level is provided between the first and the second voltage level, a gradual transformation of the voltage from the voltage of the second voltage level into the voltage of the first voltage level takes place.

The electrical energy distribution network furthermore comprises a central processing unit which is connected to the local units of the network nodes for the exchange of data and which processes the first and second energy quantity information transmitted from the local units of the network nodes to the central processing unit. On the basis of the first and/or the second energy quantity information, the second processing unit enables an exchange of energy between the network nodes within one of the first distribution networks and/or different first distribution networks which are coupled with or without the intermediate connection of the second distribution network.

The method according to the invention enables de-centrally generated energy to be distributed, in particular locally. In particular, a load balancing between the network nodes connected to one or more first distribution networks can thereby be achieved, so that the energy quantity flowing via the coupling device connecting the first distribution network to the second subnetwork can be reduced. In particular, a situation can thereby be reduced in which energy flows via the coupling device from the first distribution network into the second distribution network.

This is made possible by enabling energy trading between individual network nodes of the first distribution network directly, i.e. bypassing the energy suppliers. One advantage resulting from this for the final consumers or users consists in that the costs for energy quantities traded within a first distribution network are reduced, since, for example, some of the legal costs, such as network charges, do not need to be imposed on the generated energy quantities. Due to the direct link between energy-generating network nodes and energy-consuming network nodes within a first distribution network and/or different first distribution networks which are coupled with or without the intermediate connection of the second distribution node, the load on the energy distribution network can be relieved. The marketing of de-centrally generated energy is promoted. A private market for energy generation and energy consumption is created.

According to one appropriate design, the energy currents flowing into and/or out of the respective network nodes are recorded by the respective local units for providing the first energy quantity information and are allocated to a user. The local units may be smart meters and gateways. Gateways are computing units which aggregate data from a plurality of smart meters. The local units can be regarded as metering points of a respective network node. The information required for the local energy exchange can be collected through the communication of the local units with the central processing unit.

According to a further appropriate design, a temporary or permanent registration of a user on the local unit is monitored by a respective local unit and allocation information which comprises the allocation of the user to the local unit is forwarded to the central processing unit for the performance of a monetary transaction. This makes it possible, for example, for a final consumer which generates energy on one specific network node to consume the energy generated by it on a different network node also. Through the temporary registration, for example on a network node on which the charging of an electrically operated vehicle is enabled, the final consumer can itself consume its power generated on the other network node. The temporary or permanent registration of a user on the local unit of a network node enables a unique allocation between the local unit of the network node and the user or final consumer. Through a registration based on the exchange of information technology keys between the user and the local unit, a transparent and auditable allocation can be implemented which allows the energy generation on one network node and the energy consumption on a different network node by the same user.

According to a further advantageous design, it is provided that a generated energy quantity which is fed by a user on a first energy-generating network node into the first distribution network, and a consumed energy quantity which is drawn by the same user on a second energy-consuming network node differing from the first network node are offset against one another by the central processing unit in a monetary transaction. The energy consumption by the user on the energy-consumer network node take place at the production costs on the energy-generating network node, possibly plus legal levies.

According to a further appropriate design, the central processing unit offers an energy quantity of an energy-generating network node providable in the future as second energy quantity information for the performance of a monetary transaction. According to this design, the central processing unit can receive the second energy quantity information from the local unit of the energy-generating network node.

The energy quantity providable in the future may have been determined automatically by the local unit or may have been entered into the local unit by the user allocated thereto. The energy quantity providable in the future corresponds, for example, to the energy quantity that can be provided on the network node by an energy generation device, such as e.g. a photovoltaic system or a combined heat and power system, for or over a specific time period.

Alternatively or additionally, the central processing unit can determine the second energy quantity information on the basis of consumption and generation forecasts, in particular within the at least one first distribution network. According to this design, the second energy quantity information is determined in an automated manner on the basis of the first energy quantity information measured by the local unit of the energy-generating network node and historical data. The central processing unit can receive monetary information which is corrected by the central processing unit with legal costs for the monetary transaction in addition to the second energy quantity information from the local unit of the energy-generating network node. Such legal costs are, for example, levies and power taxes. Network charges may possibly also be incurred if the energy-consuming node is not disposed in the same first subnetwork as the energy-generating node. In other words, the distance between the energy-generating network node and the energy-consuming network node is taken into account here in respect of the total costs.

According to a further design, the central processing unit can provide the second energy quantity information for the performance of the monetary transaction for retrieval by the local units of one or more energy-consuming network nodes. As a result, a private energy-trading platform is created which enables energy-generating network nodes to present offerings on the energy-trading platform. The presentation is carried out on the basis of the second energy quantity information. Energy-consuming energy network nodes can represent demand. A mediation between supply and demand is performed by the central processing unit, preferably within the same first distribution network.

According to a further appropriate design, the central processing unit performs the monetary transaction between the energy-generating network node and the energy-consuming network node. The allocation of the relevant network nodes to respective final consumers or users is taken into account here. It can also be provided, in particular, to manage and administer all payment streams between an energy-consuming energy network node, network operators, the recipient of taxes, fees and duties and the energy-consuming network node.

In particular, it is possible for the central processing unit to manage and optimize energy industry parameters. This concerns, in particular, balance groups, so that a balance between energy feed-in and energy extraction is preferably achieved within the same first distribution network.

According to a further appropriate design, the central processing unit forecasts a flexible energy quantity from the transmitted first energy quantity information of the network nodes of the first distribution network(s) and a forecast energy availability in the first distribution network(s), wherein an offering is created via a monetary transaction to a network operator of the first and/or second distribution network or an energy market on the basis of the forecast flexible energy quantity. A virtual power station can hereby be created for the provision of power. In a virtual power station, information from decentral energy generators of the energy distribution network is aggregated in the central processing unit. The central energy transmission unit communicates with a computer of the energy transmission network, so that the energy distribution network acts as an individual virtual power station in relation to the energy transmission network. A virtual power station of this type can provide the energy transmission network with active or reactive power.

The invention furthermore provides an electrical distribution network which comprises at least one first distribution network of a first voltage level, at least one second distribution network of a second voltage level and a central processing unit for the provision of electric power for controlling the electrical distribution network. A respective first distribution network comprises a respective number of network nodes which are connected to a power line of the first distribution network. A first part of the network nodes comprises energy consumers, a second part of the network nodes comprises energy generators and a third part of the network nodes comprises both energy consumers and energy generators. Each of the network nodes comprises a local unit for recording and providing first energy quantity information which represents a measured energy quantity, and for the provision of second energy quantity information which represents a tradable energy quantity. The at least one second distribution network comprises one or more central energy generators. The second voltage level is greater than the first voltage level. The first and the second subnetwork are coupled via at least one coupling device transforming the voltages of the first and the second voltage level for the exchange of energy. The central processing unit is connected to the local units for exchanging data and is designed to process the first and second energy quantity information transmitted from the local units to the central processing unit. An exchange of energy between network nodes within one of the first distribution networks and/or different first distribution networks which are coupled with or without the intermediate connection of the second distribution network can thereby take place on the basis of the first and/or the second energy quantity information.

The energy distribution network according to the invention is preferably configured to implement one or more preferred variants of the method according to the invention.

The invention additionally relates to a control unit for the electrical distribution network described above. The control unit represents the central processing unit of the energy distribution network. The control unit is designed in such a way that it communicates with the local units of the network nodes and controls the energy distribution network by means of this communication in such a way that, on the basis of first and/or second energy quantity information, an exchange of energy takes place between the network node within one of the first distribution networks and/or different first distribution networks which are coupled with or without the intermediate connection of the second distribution network.

Other objects, advantages and novel features of the present invention will become apparent from the following detailed description of one or more preferred embodiments when considered in conjunction with the accompanying drawings.

BRIEF DESCRIPTION OF THE DRAWINGS

Example embodiments of the invention are described in detail below with reference to the attached figures.

DETAILED DESCRIPTION OF THE DRAWINGS

Figure 1:
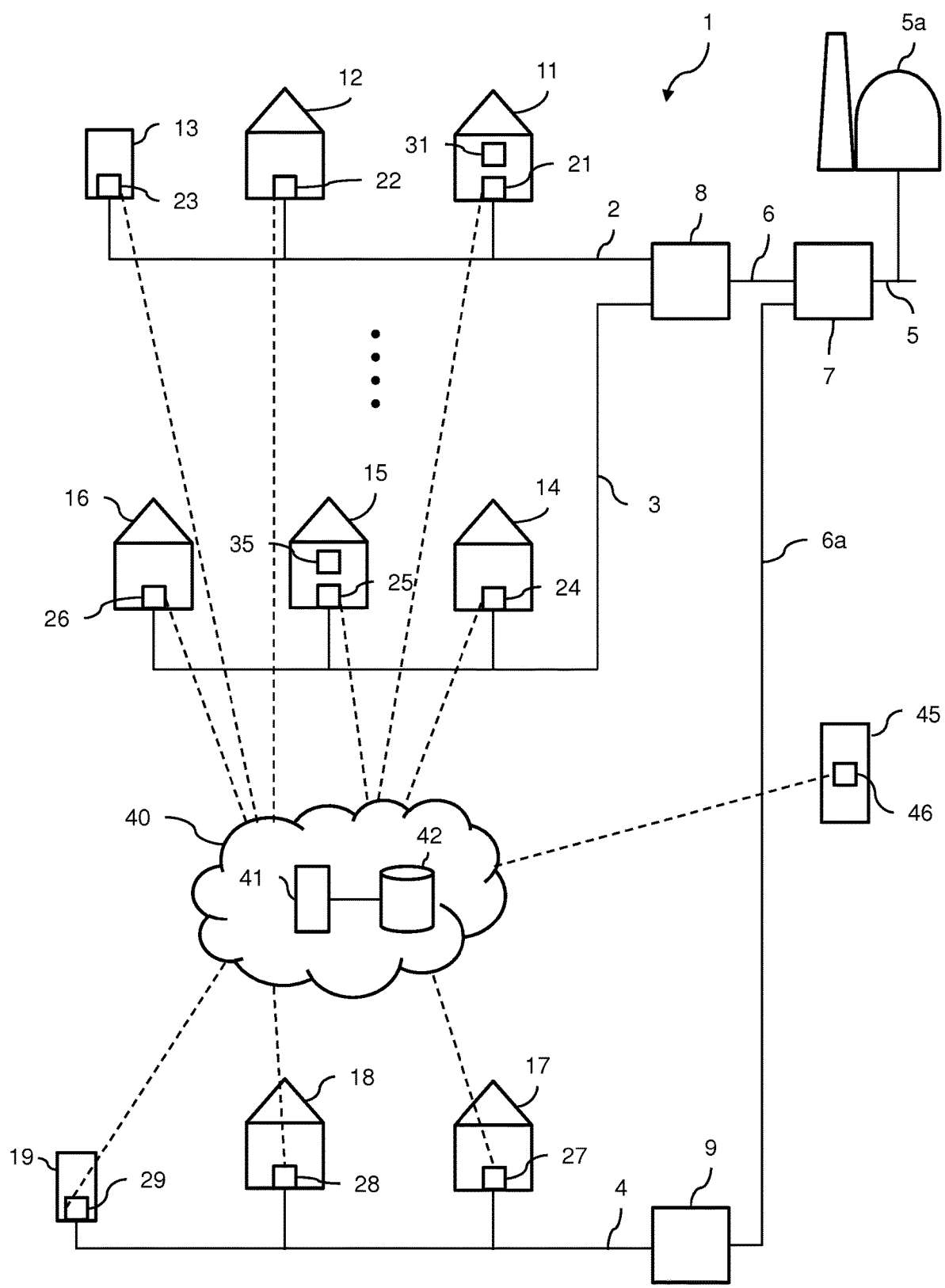
FIG. 1 shows a schematic representation of an energy distribution network according to the invention in which the control method according to the invention is carried out.

FIG. 1 shows, in a schematic representation, the structure of an electrical distribution network 1 according to the invention on the basis of which different variants of control methods according to the invention are carried out and are described below. The energy distribution network 1 comprises merely by way of example three first distribution networks 2, 3, 4. The first distribution networks 2, 3, 4 are low-voltage networks, the voltage level of which is, for example, 400 V. The first distribution network 2 and the first distribution network 3 are connected to a coupling device 8. The coupling device 8 is connected via a third distribution network, for example a medium-voltage network, to a coupling device 7. The coupling device 7 is in turn connected to a second distribution network 5, e.g. a high-voltage network with a voltage of 110 kV. The first distribution network 4 is connected via a coupling device 9 to a third distribution network 6a, for example again a medium-voltage network with a voltage of 11 kV. The third distribution network 6a is connected in the same way as the third distribution network 6 to the coupling device 9. The second and the third distribution networks can be regarded as transmission networks which transport power over long distances. The power is then distributed at local level via a multiplicity of first distribution networks.

The coupling devices 7, 8, 9 are transformers which perform a voltage transformation in a known manner between the different voltage levels connected to the respective coupling device. A central energy generator 5a, e.g. a power station such as a coal-powered or nuclear power station, is connected merely by way of example to the second distribution network 5.

A number of network nodes are connected in each case to the first distribution network 2, 3, 4. The number of network nodes can, in principle, be randomly chosen. In the present example embodiment, three network nodes 11, 12, 13 are connected to the first subnetwork 2. The first distribution network 3 comprises—similarly merely by way of example—three network nodes 14, 15, 16. In a corresponding manner, the first distribution network 4 similarly comprises—merely by way of example—three network nodes 17, 18, 19. A network node may generally be an energy-consuming network node, an energy-generating network node or both an energy-consuming and an energy-generating network node (at different times). In this example embodiment, the network node 11 of the first distribution network 2 and the network node 15 of the first distribution network 3 represent energy-generating network nodes. For this purpose, the network node 11 has an energy generation device 31 and the network node 15 has an energy generation device 35. The energy generation devices 31, 35 may, for example, be photovoltaic modules, wind farms, combined power and heat plants and the like. At the same time, the network nodes 11, 15, may also be energy-consuming energy network nodes. An exclusively energy-generating network node would, for example, be a combined heat and power plant or the like connected to a respective first distribution network 2, 3, 4. In this example embodiment, the network nodes 12, 13 of the first distribution network 2, the network nodes 14, 16 of the first distribution network 3 and the network nodes 18, 19 of the first distribution network 4 represent the energy-consuming energy network nodes.

Each of the network nodes 11, . . . , 19 is equipped with a local unit 21, . . . , 29. A respective local unit 21, . . . , 29 serves to record and provide first energy quantity information which represents a measured energy quantity. A measured energy quantity is both the energy quantity fed by an energy-generating network node into the relevant distribution network and the consumed energy quantity flowing from the first distribution network into the respective network node. In addition, the respective local units 21, . . . , 29 also serve to provide second energy quantity information. The second energy quantity information represents a tradable energy quantity. The local units 21, . . . , 29 are e.g. smart meters or gateways which are connected to a plurality of smart meters of a network node and aggregate measured energy quantities.

Even if the present example embodiments are all network nodes of all first distribution networks equipped with a local unit, the method according to the invention can be carried out even if only a partial number of the network nodes are provided with a local unit of this type.

The energy distribution network according to the invention additionally comprises a central processing unit 41. The central processing unit may comprise a memory or a database 42 or may be connected thereto. The central processing unit 41 and the memory or the database 42 are connected to a network 40, for example the Internet, and can exchange data with the local units 21, . . . , 29.

The central processing unit 41 processes the first and second energy quantity information transmitted from the local units 21, . . . , 29 to the central processing unit 41. An exchange of energy between the network nodes within one of the first distribution networks 2, 3, 4 and/or different first distribution networks 2, 3, 4 which are coupled with or without the intermediate connection of the second network node is enabled on the basis of the first and/or the second energy quantity information.

In this way, the central processing unit can distribute the power being generated by an energy-generating network node, e.g. the network node 11, within the first distribution network 2 to energy-consuming network nodes 12, 13 connected there, whereby energy industry parameters, such as e.g. balance groups, can be optimized. In addition as described in detail below, this enables a private energy-trading platform on or via which the energy quantities can be traded between final consumers, bypassing suppliers.

Figure 2:
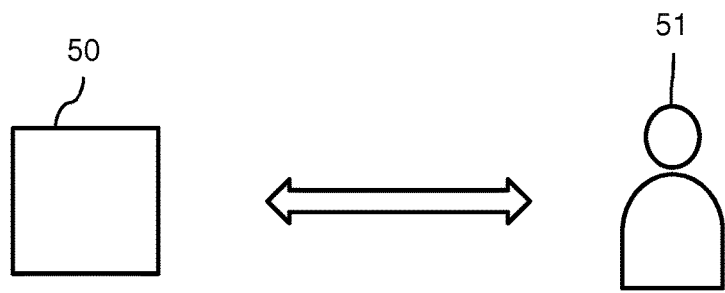
FIG. 2 shows a schematic representation of the allocation of a network node to a final consumer or user.

As shown schematically in FIG. 2, each network node 11 or, more precisely, each local unit 21, . . . , 29 of a network node 11, . . . , 19 is allocated to a respective final consumer or user 51. A transparent allocation can be implemented through the allocation which is effected, for example, through a temporary or permanent registration on the respective local unit. A registration on the local unit by a final consumer is effected, for example, through the exchange of information technology cryptographic keys. An auditable as well as transparent allocation can thereby be implemented. This enables the final consumer of the network node 11 to transmit an energy quantity to the final consumer of an energy-consuming network node, e.g. the network nodes 12 or 13. The resulting energy flows are recorded using the measured energy quantity information on the local units and are allocated to the respective users. Different user scenarios are thereby conceivable.

The user of the network node 11 produces a specific energy quantity with its energy generation device 31. The produced energy quantity is recorded by the local unit 21 and fed into the first distribution network 2. The network node 13 represents, for example, a charging station for an electric vehicle of the user of the network node 11. The user of the network node 11 can register temporarily on the network node 13 for a charging procedure for its electrically operated vehicle. The registration is effected on the local unit 23. The energy quantity drawn via the energy-consumed network node 13 is recorded during the charging procedure. Through the allocation of the consumed energy quantity to a user, the user can consume the energy quantity generated by itself by means of the energy generation device 31. The user of the network node 11 does not need to pay the price stipulated by an energy supplier (e.g. the operator of the central energy generation device 5a). Instead, it consumes the power produced at significantly lower costs via its energy generation device 31. The central processing unit takes account of costs incurred through the transmission of the power via the first distribution network 2, such as e.g. levies or power tax. On the whole, however, this price is significantly lower than the price demanded by the energy supplier.

The same use is similarly enabled if the energy is generated by the user of the network node 11 in the network node 11, but is consumed, for example, on the network node 18 of the first distribution network 4. Since the first distribution network 2 is not connected to the same coupling point 8 as the first distribution network, the energy quantity generated by the energy generation device 31 must be transmitted over a longer distance and via the third distribution networks 6 and 6a. For that reason, other legal costs, such as e.g. a network charge, may possibly have to be taken into account.

A similar use occurs if a user community has an exclusively energy-generating network node and the energy generated by this network node is consumed within the same first distribution network.

The network load can be optimized within the energy distribution network through this type of decentralized energy generation and local energy consumption. A possibly necessary control is effected here using the central processing unit 41 which can transmit possibly necessary shortfalls in the energy quantities to a computer 45 of a network operator and/or of an energy generator and/or of an energy exchange. The corresponding energy can then be fed by the network operator and/or the central energy generator at the latter's cost structure into the first distribution network. In addition, it is possible for a plurality of users of different network nodes to be combined to form a virtual power station in order to provide larger energy quantities. Network services, for example, for the provision of energy capacity can hereby be implemented without a participation in the central energy market.

The infrastructure described in FIG. 1 can similarly be used to implement a private energy-trading platform. This energy-trading platform enables the presentation of offerings involving available, free energy quantities using the second energy quantity information. The second energy quantity information can be determined in an automated manner by the central processing unit 41 on the basis of actual values, determined in the past, of the respective fed-in energy quantities of energy-generating network nodes. Offered energy quantities can also be specified by a user through respective local units 21, ..., 29 of the energy-generating network nodes and can be transmitted to the central processing unit 41. The energy quantities offered on the energy-trading platform can then be requested by the energy-requesting network nodes. This is shown with reference to FIG. 3.

Figure 3:
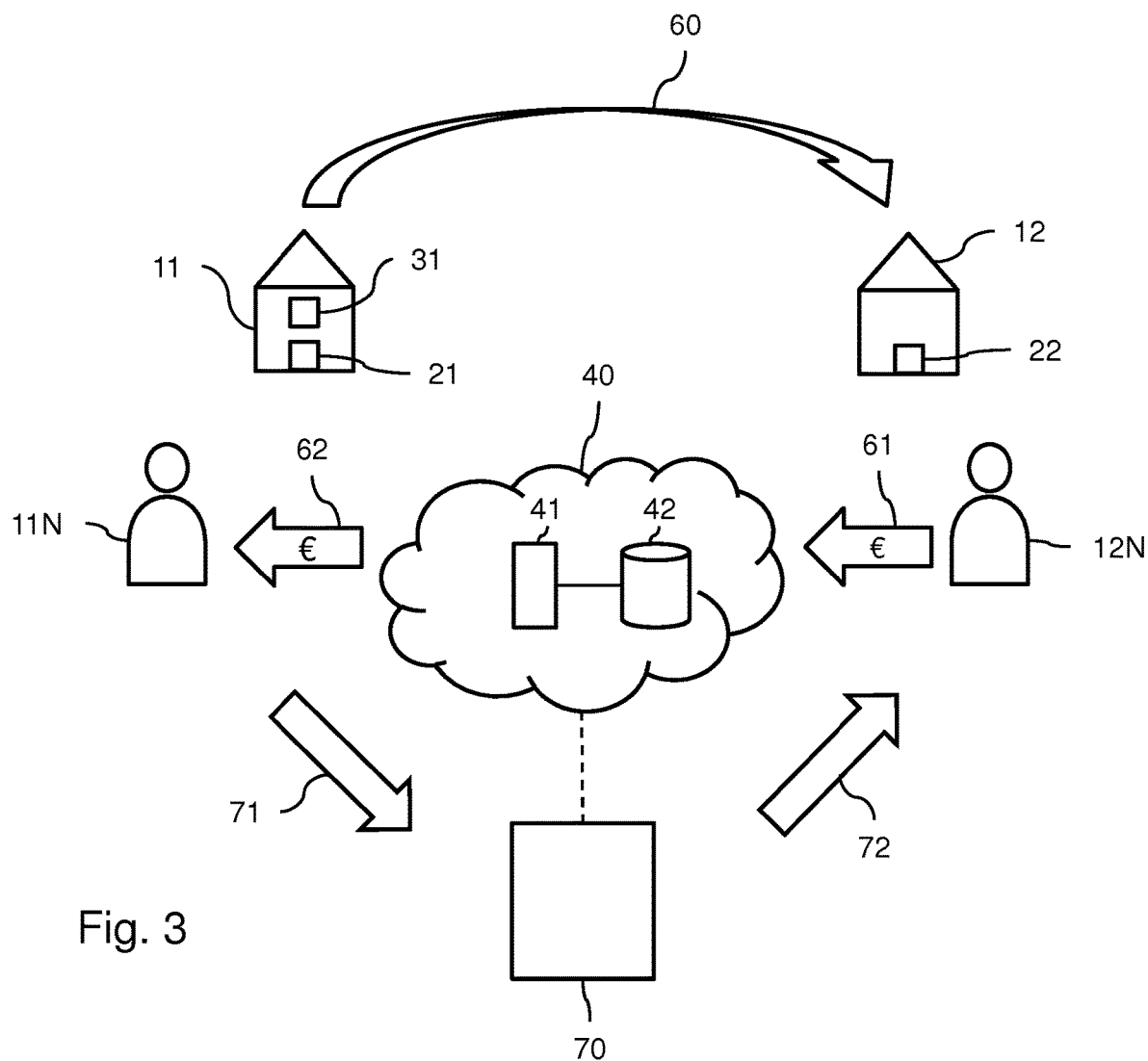
FIG. 3 shows a schematic representation of a variant of the control method according to the invention.

In this example embodiment, the network node 11, with its local unit 21 and the energy generation device 31, is intended to be the energy-generating network node which offers a specific energy quantity on the energy-trading platform. The network node 12 is an energy-consuming network node which can purchase the energy quantity offered by the user of the network node 11 using the energy-trading platform which is provided by the central processing unit 41 and the associated database 42. In FIG. 3, the user allocated to the network node 11 is denoted 11N and the user allocated to the network node 12 is denoted 12N. The user 11N provides an offering on the trading platform 70, wherein the offering may be contained in the form of a message transmitted from the local unit 21 to the central processing unit. In the offering 71, the user 11N indicates the energy quantity providable by it in future, the time period of the energy provision and the price demanded by it. Corresponding offerings can also be transmitted from further energy-consuming providers (not shown in the figure) to the central processing unit 41. The requesting user 12N can view these offerings in the trading platform 70. In the presentation of the offering price, the trading platform 70 takes into account the price demanded by the offering users 11N, plus legal costs, such as e.g. network charges, levies and power tax. In the present example embodiment, the requesting user 12N selects the user 11N as the energy supplier. The demand from the user 12N is shown by the arrow 72. The payment stream is implemented via the central processing unit 41. In the monetary transaction, the user 12N pays money to the operator of the central processing unit 41 (arrow 61). For the energy supply (indicated by the energy flow from the energy-generating network node 11 to the energy-requesting network node 12), the user 11N receives the corresponding requested amount from the operator of the central processing unit, as indicated by the arrow 62. While the user 12N pays the amount demanded by the user 11N, plus the legal costs, to the operator of the central processing unit 41, the user 11N receives only the demanded price for the generation (i.e. the total price, minus the legal costs) from the operator of the central processing unit in the monetary transaction. The central processing unit thus provides a billing system, wherein the latter can be implemented for each local unit.

In addition, the platform can determine a necessary flexibility by means of actual quantities and a forecast energy availability using the first and second energy quantity information. On this basis, the platform generates offerings to the energy market and network operator in an automated manner. In relation to FIG. 1, a communication takes place here between the central processing unit 41 and the computer 45 of the network operator or central energy generator.

Through the direct relationship between energy generation and consumption, the load on the energy distribution network can be relieved, since locally generated energy is conveyed whenever possible to energy consumers located as close as possible. An interface is thus created between users, network operators and the energy market by means of the central processing unit.

REFERENCE NUMBER LIST

1 Energy distribution network
2 First distribution network of first voltage level (low-voltage network, e.g. 400 V)
3 First distribution network of first voltage level (low-voltage network, e.g. 400 V)
4 First distribution network of first voltage level (low-voltage network, e.g. 400 V)
5 Second distribution network of second voltage level (high network, e.g. 110 kV)
5a Central energy generator
6 Third distribution network of third voltage level (medium-voltage network, e.g. 11 kV)
6a Third distribution network
7 Coupling device
8 Coupling device
9 Coupling device
11 Network node
11N User/contractual partner allocated to the network node 11
12 Network node
12N User/contractual partner allocated to the network node 12
13 Network node
14 Network node
15 Network node
16 Network node
17 Network node
18 Network node
19 Network node
11 Local unit
12 Local unit
13 Local unit
14 Local unit
15 Local unit
16 Local unit
17 Local unit
18 Local unit
19 Local unit
31 Energy generation device
35 Energy generation device
40 Internet
41 Central processing unit
42 Memory/database
45 Computer of a network operator and/or central energy generator and/or energy exchange
46 Local unit
50 Local unit (representing the local units 21, 22, 23, ..., 29)
51 User or contractual partner
60 Energy flow
61 Monetary transaction
62 Monetary transaction
70 Trading platform
71 Supply
72 Demand The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an electrical energy distribution network, the method comprising the acts of:
   connecting at least one first distribution network of a first voltage level which comprises a plurality of network nodes to a power line of the at least one first distribution network, wherein a first part of the plurality of network nodes comprises energy consumers, a second part of the plurality of network nodes comprises energy generators, and a third part of the plurality of network nodes comprises both energy consumers and energy generators,
   recording, by a smart meter and/or gateway of each of the plurality of network nodes, first energy quantity information which represents a measured energy quantity;
   providing, by the smart meter and/or gateway of each of the plurality of network nodes, second energy quantity information which represents a tradable energy quantity;
   transforming, by at least one transformer configured to couple the at least one first distribution network to a second distribution network, the first voltage level of the at least one first distribution network to a second voltage level of the second distribution network for an exchange of energy between the at least one first distribution network and the second distribution network, wherein the second distribution network comprises one or more central energy generators and the second voltage level is greater than the first voltage level; and
   exchanging energy, by a central processing unit connected to the smart meters and/or gateways and based on first and second energy quantity information received by the central processing unit from the smart meters and/or gateways, between the plurality of network nodes within one of the at least one first distribution network and/or across different ones of the at least one first distribution network.

2. The method as claimed in claim 1, further comprising recording, by the smart meter and/or gateway of each of the plurality of network nodes, energy currents flowing into and/or out of the respective network node and allocating said energy currents to a user.

3. The method as claimed in claim 1, further comprising:
   monitoring a registration of a user on a respective one of the smart meter and/or gateway by the respective one of the smart meters and/or gateways;
   forwarding allocation information, which comprises an allocation of the user to the respective one of the smart meters and/or gateways to the central processing unit; and
   performing a monetary transaction, by the central processing unit, based on the forwarded allocation information.

4. The method as claimed in claim 2, further comprising:
   monitoring a registration of a user on a respective one of the smart meter and/or gateway by the respective one of the smart meters and/or gateways;
   forwarding allocation information, which comprises an allocation of the user to the respective one of the smart meters and/or gateways to the central processing unit; and
   performing a monetary transaction, by the central processing unit, based on the forwarded allocation information.

5. The method as claimed in claim 1, further comprising offsetting, in a monetary transaction, a generated energy quantity which is fed by a user on a first energy-generating network node into the at least one first distribution network, and a consumed energy quantity which is extracted by said user on a second energy-consuming network node differing from the first energy-generating network node.

6. The method as claimed in claim 2, further comprising offsetting, in a monetary transaction, a generated energy quantity which is fed by a user on a first energy-generating network node into the at least one first distribution network, and a consumed energy quantity which is extracted by said user on a second energy-consuming network node differing from the first energy-generating network node.

7. The method as claimed in claim 3, further comprising offsetting, in a monetary transaction, a generated energy quantity which is fed by a user on a first energy-generating network node into the at least one first distribution network, and a consumed energy quantity which is extracted by said user on a second energy-consuming network node differing from the first energy-generating network node.

8. The method as claimed in claim 1, further comprising:
   offering, by the central processing unit, an energy quantity of an energy-generating network node providable in the future as second energy quantity information; and
   performing a monetary transaction, by the central processing unit, based on the second energy quantity information.

9. The method as claimed in claim 8, further comprising receiving, by the central processing unit, the second energy quantity information from the smart meter and/or gateway of the energy-generating network node.

10. The method as claimed in claim 8, further comprising determining, by the central processing unit, the second energy quantity information based on consumption and generation forecasts within the at least one first distribution network.

11. The method as claimed in claim 8, further comprising receiving, by the central processing unit, monetary information which is corrected by the central processing unit with legal costs for the monetary transaction in addition to the second energy quantity information from the smart meter and/or gateway of the energy-generating network node.

12. The method as claimed in claim 8, further comprising providing, by the central processing unit, the second energy quantity information for the performance of the monetary transaction for retrieval by the smart meters and/or gateways of one or more energy-consuming network nodes.

13. The method as claimed in claim 8, further comprising performing, by the central processing unit, the monetary transaction between the energy-generating network node and the energy-consuming network node.

14. The method as claimed in claim 1, further comprising:
   forecasting, by the central processing unit, a flexible energy quantity from the measured first energy quantity information of the plurality of network nodes of the at least one first distribution network and a forecast energy availability in the at least one first distribution network; and
   generating, based on the forecasted flexible energy quantity, an offering via a monetary transaction to a first network operator of the at least one first and/or second distribution network or an energy market.

15. An electrical energy distribution network comprising:
   at least one first distribution network of a first voltage level which comprises a plurality of network nodes which are connected to a power line of the at least one first distribution network, wherein a first part of the plurality of network nodes comprises energy consumers, a second part of the plurality of network nodes comprises energy generators, and a third part of the plurality of network nodes comprises both energy consumers and energy generators, and wherein each of the plurality of network nodes comprises a smart meter and/or gateway configured to record first energy quantity information which represents a measured energy quantity, and to provide second energy quantity information which represents a tradable energy quantity;

a second distribution network of a second voltage level which comprises one or more central energy generators, wherein the second voltage level is greater than the first voltage level and the at least first distribution network and the second distribution network are coupled via at least one transformer that is configured to transform the voltages of the first and the second voltage level for an exchange of energy between the at least one first distribution network and the second distribution network; and a central processing unit connected to the smart meters and/or gateways and configured to exchange data and to process first and second energy quantity information transmitted from the smart meters and/or gateways to the central processing unit such that, based on a least one of the first and second energy quantity information, an exchange of energy is provided between the network nodes within one of the at least one first distribution network and/or across different ones of the at least one first distribution network.

16. The electrical energy distribution network as claimed in claim 15, wherein the smart meter and/or gateway of each of the plurality of network node is configured to record energy currents flowing into and/or out of the respective network nodes and to allocate said energy currents to a user.

17. The electrical energy distribution network as claimed in claim 15, wherein a respective one of the smart meters and/or gateways is configured to:

monitor a registration of a user on the respective one of the smart meters and/or gateways, and forward allocation information, which comprises an allocation of the user to the respective one of the smart meters and/or gateways to the central processing unit, wherein the central processing unit is configured to perform a monetary transaction based on the forwarded allocation information.

18. The electrical energy distribution network as claimed in claim 15, wherein a generated energy quantity, which is fed by a user on a first energy-generating network node into the at least one first distribution network, and a consumed energy quantity which is extracted by said user on a second energy-consuming network node differing from the first energy-generating network node, are offset in a monetary transaction by the central processing unit.

* * * * *